(12) United States Patent
Smith et al.

(10) Patent No.: US 9,132,870 B2
(45) Date of Patent: Sep. 15, 2015

(54) WORKING MACHINE

(71) Applicant: J.C. BAMFORD EXCAVATORS LIMITED, Uttoxeter, Staffordshire (GB)

(72) Inventors: Duncan Smith, Uttoxeter (GB); David Price, Uttoxeter (GB)

(73) Assignee: J.C. BAMFORD EXCAVATORS LIMITED, Uttoxeter (GB)

(*) Notice: Subject to any disclaimer, the term of this patent is extended or adjusted under 35 U.S.C. 154(b) by 0 days.

(21) Appl. No.: 13/945,854

(22) Filed: Jul. 18, 2013

(65) Prior Publication Data

US 2014/0020963 A1    Jan. 23, 2014

(30) Foreign Application Priority Data

Jul. 20, 2012  (GB) ................................. 1212926

(51) Int. Cl.
| | |
|---|---|
| *B62D 55/084* | (2006.01) |
| *B62D 55/06* | (2006.01) |
| *E02F 3/32* | (2006.01) |
| *E02F 9/02* | (2006.01) |

(52) U.S. Cl.
CPC .............. *B62D 55/06* (2013.01); *B62D 55/084* (2013.01); *E02F 3/325* (2013.01); *E02F 9/024* (2013.01)

(58) Field of Classification Search
CPC ........ B62D 55/06; B62D 55/084; E02F 9/024
USPC .......................................... 180/9.48; 305/131
See application file for complete search history.

(56) References Cited

U.S. PATENT DOCUMENTS 2,763,330 A * 9/1956 Potter ........................... 180/9.48
3,749,193 A * 7/1973 Blase et al. ................... 180/9.48
3,894,598 A * 7/1975 Yeou ............................. 180/9.48

(Continued)

FOREIGN PATENT DOCUMENTS

| CN | 102390446 A | 3/2012 |
|---|---|---|
| EP | 0 803 428 A1 | 10/1997 |
| EP | 1 201 830 A2 | 5/2002 |

(Continued)

OTHER PUBLICATIONS

Search Report for GB 1212926.8, dated Oct. 25, 2012.

(Continued)

*Primary Examiner* — Tony Winner
(74) *Attorney, Agent, or Firm* — Marshall, Gerstein & Borun LLP

(57) ABSTRACT

A working machine having a chassis,
 a first track assembly including a first track mounted for movement around a first track support, the first track assembly being mounted to the chassis by at least a first beam, the first beam being moveable relative to the chassis to vary the distance between the chassis and the first track assembly,
 a second track assembly including a second track mounted for movement around a second track support, the second track support defining a second inner face,
 the working machine having an extended position and a retracted position such that the first track assembly is spaced further from the second track assembly when in the extended position than when in the retracted position,
 wherein when the working machine is in the retracted position a first portion of the first beam is positioned outboard of the second inner face.

16 Claims, 12 Drawing Sheets

(56) References Cited

U.S. PATENT DOCUMENTS

| | | | |
|---|---|---|---|
| 4,431,074 A | 2/1984 | Langerud | |
| 2009/0229894 A1* | 9/2009 | Roucka | 180/9.48 |

FOREIGN PATENT DOCUMENTS

| | | | |
|---|---|---|---|
| EP | 2 221 240 A1 | 8/2010 | |
| FR | 2249545 A5 | 5/1975 | |
| WO | WO-97/31813 A1 | 9/1997 | |
| WO | WO-2005/090103 A1 | 9/2005 | |

OTHER PUBLICATIONS

Extended European search report for corresponding European patent application No. EP13175261.0, dated Oct. 24, 2013.

* cited by examiner

WORKING MACHINE

FIELD OF THE INVENTION

The present invention relates to a working machine, in particular a working machine having one or more tracks.

BACKGROUND OF THE INVENTION

Working machines such as excavators are known and include two tracks laterally spaced from each other. The tracks are attached to a chassis upon which a body is rotatably mounted about a generally vertical axis. The body includes a working implement such as a loading arm. At an end of the loading arm is a bucket. The excavator can move a load (such as earth) by rotating the body about a generally vertical axis. As the body rotates with a full bucket then the centre of gravity of the vehicle as a whole moves as the loading arm swings. Additionally, in some excavators the loading arm may swing about a king post relative to the body about a vertical axis.

Some excavators have the track set at a fixed distance apart which is relatively large distance. Accordingly, if a load is picked up with the arm pointing forwards, i.e. parallel to the tracks, and that load is then swung sideways as the body is rotated 90 degrees, then the centre of the gravity of the machine will move towards that track which is located between the bucket and the rotational axis of the body. The spacing of the track is designed so that the machine is stable under these circumstances.

Other excavators, typically small excavators, have the ability to vary the distance between the two tracks. Thus, for access purposes to gain access through narrow gates and the like, and for example when the excavator is loaded onto a relatively narrow transportation trailer, the tracks can be positioned in a retracted position where they are relatively close together. When the excavator is required to carry out work, such as moving loads, then the tracks are extended to a deployed (or extended) position where they are positioned further apart in the retracted position. This gives the excavator more lateral stability.

Some excavators with variable track have a first track assembly mounted on two laterally extending beams and a second track assembly mounted on a further two laterally extending beams. Each pair of beams is slideably mounted in the chassis. The track assembly and associated beam can be extended away from the chassis to a deployed position and can be moved towards the chassis in a retracted position. In the deployed position the beams act as cantilevers and therefore must have a certain overlap with the chassis so as to ensure mechanical integrity. Because of this overlap, when the tracks are in their retracted position the left hand end of the beams of the right hand track is close to the inside edge of the left hand track and vice versa. This limits the amount of extension each beam can achieve relative to the chassis.

Furthermore, the tracks are moved apart and together by a hydraulic actuator which is attached to the inside of each track assembly. The spacing apart of the tracks in the retracted position limits the length of the hydraulic actuator which in turn limits the amount by which the tracks can be extended.

An object of the present invention is to provide a working machine with improved track extension/retraction abilities.

SUMMARY OF THE INVENTION

Thus, according to a first aspect of the present invention there is provided a working machine having a chassis, a first track assembly including a first track mounted for movement around a first track support, the first track assembly being mounted to the chassis by at least a first beam, the first beam being moveable relative to the chassis to vary the distance between the chassis and the first track assembly, a second track assembly including a second track mounted for movement around a second track support, the second track support defining a second inner face, the working machine having an extended position and a retracted position such that the first track assembly is spaced further from the second track assembly when in the extended position than when in the retracted position, wherein when the working machine is in the retracted position a first portion of the first beam is positioned outboard of the second inner face.

Advantageously by positioning a portion of the first beam outboard of the inner face of the opposite track assembly enables the beam to be longer and hence when the working machine is in its extended position the first track assembly can be positioned further away from the chassis whilst maintaining an adequate beam overlap with the chassis.

The second inner face may include an aperture through which said portion passes.

The second track support may define a second outer face and wherein when the working machine is in the retracted position said first portion of the first beam may be positioned outboard of the second outer face.

The second outer face may include an aperture through which said first portion passes.

The second track support may include at least an inner panel defining the second inner surface and an outer panel and a connecting portion connecting the inner panel to the outer panel.

The first track support may define a first inner face, and the second track assembly is mounted to the chassis by at least a second beam, the second beam being moveable relative to the chassis to vary the distance between the chassis and the second track assembly, wherein the working machine is in the retracted position a second portion of the second beam is positioned outboard of the first inner face.

The first inner face may include an aperture through which said second portion passes.

The first track support may define a first outer face and wherein when the working machine is in the retracted position said second portion of the second beam is positioned outboard of the first outer face.

The first outer face may include an aperture through which said second portion passes.

The first track support may include at least an inner panel defining the first inner surface and an outer panel and a connecting portion connecting the inner panel to the outer panel.

According to a further aspect of the present invention there is provided a working machine including:
a chassis,
a first track assembly including a first track mounted for movement around a first track support, the first track support defining a first inner face, the first track assembly being mounted moveably relative to the chassis to vary the distance between the chassis and the first track assembly,
an actuator having a first end mounted on the first track support and having a portion grounded on a separate portion of the working machine such that the actuator is operable to vary the distance between the chassis and the first track assembly in which at least a portion of the first end is positioned outboard of the first inner face.

By positioning a portion of the first end of the actuator outboard of the inner face of the associated track assembly allows the actuator to have a greater stroke which in turn allows the track assembly to be extended further.

The first inner face may include an aperture through which said at least a portion of the first end passes.

The first track support may define a first outer face wherein said at least a portion of the first end is positioned outboard of the first outer face.

The first outer face may include an aperture through which said at least a portion of the first end passes.

The first end may include a first end aperture for receiving a first mounting pin wherein
- at least a portion of the first end aperture is positioned outboard of the first inner face,
- preferably all of the first end aperture is positioned outboard of the first inner face,
- preferably at least a portion of the first end aperture is positioned outboard of the first outer face,
- preferably all of the first end aperture is positioned outboard of the first outer face.

The actuator may be a hydraulic actuator or an electromechanical actuator, such as a linear actuator.

The hydraulic actuator may include a first piston moveably mounted in a first cylinder and the first end may be connected to the first piston by a first rod, the first rod may pass through a first end face of the first cylinder wherein the first end face may be positioned outboard of the first inner face.

The first track support may include at least an inner panel defining the first inner surface and an outer panel and a connecting portion connecting the inner panel to the outer panel.

A second track assembly may include a second track mounted for movement around a second track support, the second track support defining a second inner face, the second track assembly being mounted moveably relative to the chassis to vary distance between the chassis and the second track assembly
- an actuator having a second end mounted on the second track support such that the actuator is operable to vary the distance between the chassis and the second track assembly in which at least a portion of the second end is positioned outboard of the second inner face.

The second inner face may include an aperture through which said at least a portion of the second end passes.

The second track support may define a second outer face wherein said at least a portion of the second end is positioned outboard of the second outer face.

The second outer face may include an aperture through which said at least a portion of the second end passes.

The second end may include a second end aperture for receiving a second mounting pin wherein
- at least a portion of the second end aperture is positioned outboard of the second inner face,
- preferably all of the second end aperture is positioned outboard of the second inner face,
- preferably at least a portion of the second end aperture is positioned outboard of the second outer face,
- preferably all of the second end aperture is positioned outboard of the second outer face.

The actuator may be a hydraulic actuator comprising a first piston moveable in a first cylinder.

The hydraulic actuator may include a second piston moveable mounted in a second cylinder and the second end is connected to the second piston by a second rod, the second rod passes through a second end face of the second cylinder wherein the second end face is positioned outboard of the second inner face.

The second track support may include at least an inner panel defining the inner surface and an outer panel and a connecting portion connecting the inner panel to the outer panel.

The first cylinder may be common with the second cylinder.

According to a further aspect of the present invention there is provided a working machine according to the first aspect of the present invention mentioned above and according to the further aspect of the present invention mentioned above.

The invention will now be described by way of example only with reference to the accompanying drawings in which:

DETAILED DESCRIPTION

Figure 1:
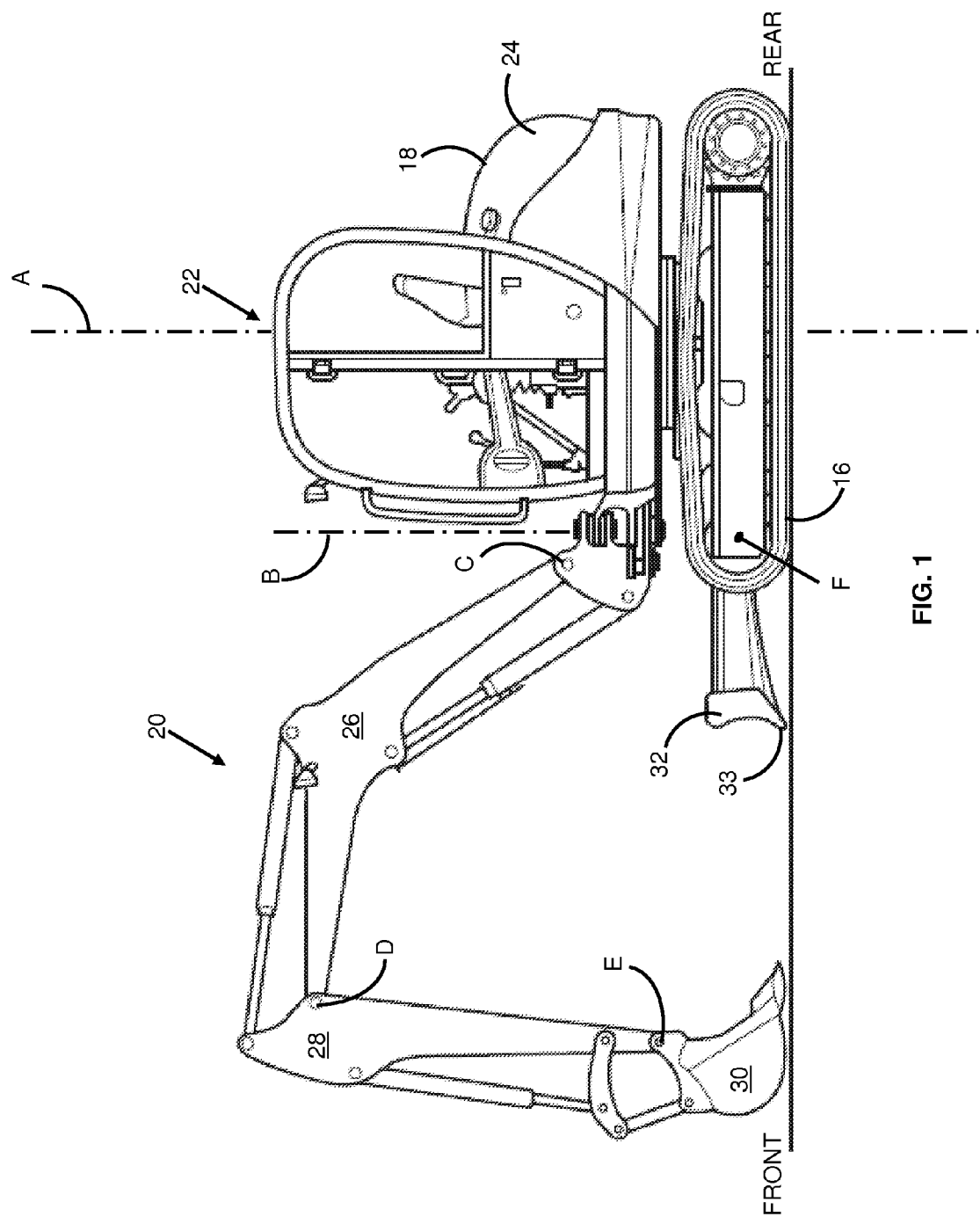
FIG. 1 is a side view of a working machine according to the present invention.
Figure 2:
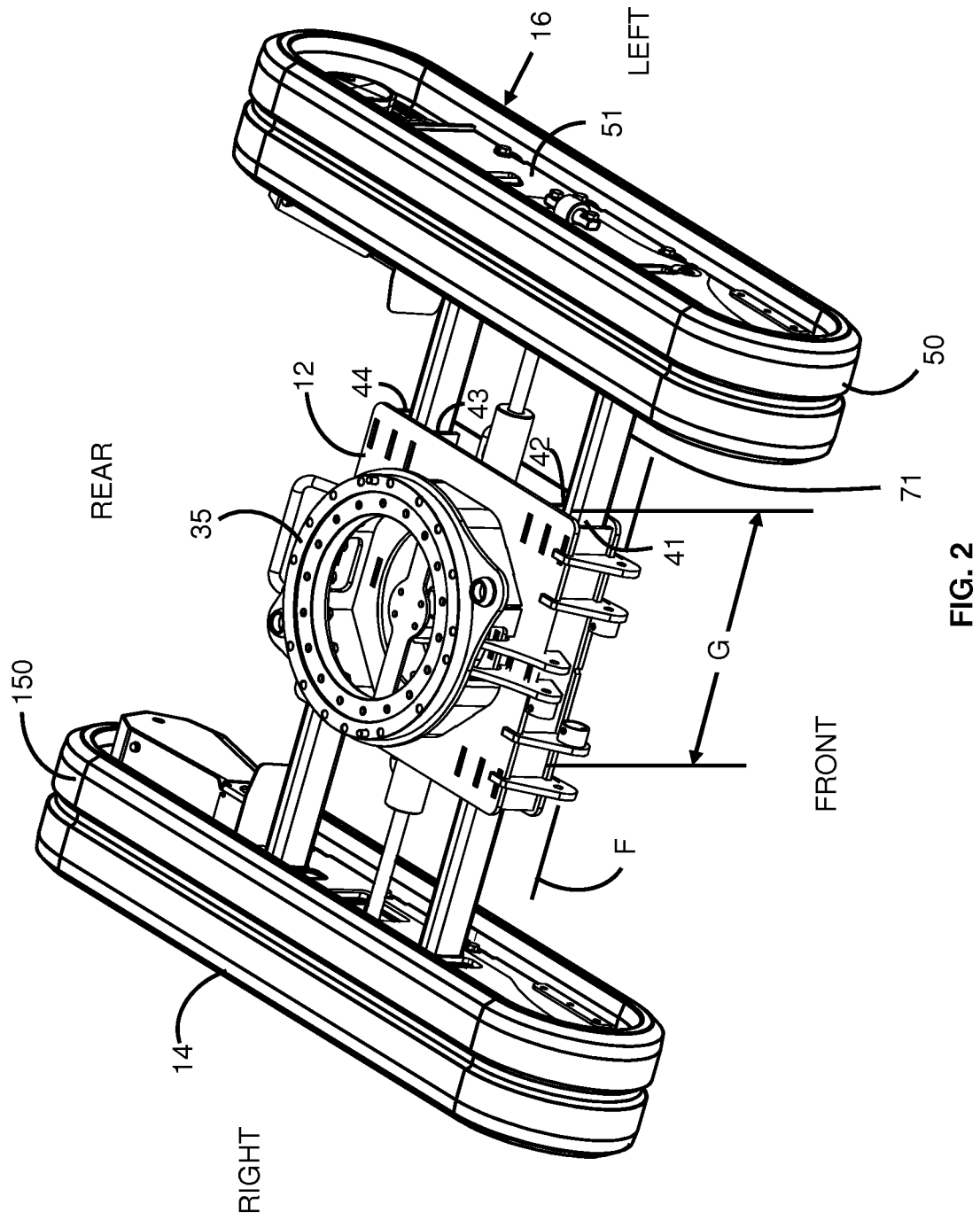
FIGS. 2, 3, 4 and 10 show isometric views (looking from the front left side) of parts of working machine of FIG. 1 with the tracks in their extended position.

With reference to FIGS. 1 and 2 there is shown a working machine 10, in this case a mini excavator. The mini excavator includes a chassis 12, a right side track assembly 14, a left side track assembly 16, a body 18 and a working arm 20. The body is rotatable about a generally vertical axis A and includes a cab 22 and a prime mover in the form of an engine (not shown) but positioned under engine cover 24. The working arm 20 includes a boom 26, a dipper arm 28 and a bucket 30. The boom 26 is rotatable about a generally vertical axis B relative to the body and about a generally horizontal axis C. The dipper arm 28 is rotatable about a generally horizontal axis D relative to the boom. The bucket is rotatable about a generally horizontal axis E relative to the dipper arm. On the front of the chassis is a blade 32 having a lower front edge 33. The boom is pivotable about a generally horizontal axis F (see FIGS. 1 and 2).

FIG. 2 shows part of the chassis 12 in more detail and in particular the ring 35 upon which is rotatably mounted the body 18. The chassis 12 includes four laterally orientated slots 41, 42, 43 and 44, each having a generally rectangular cross section. Slots 41 and 42 are positioned in front of ring 35 and slots 43 and 44 are positioned behind ring 35. Slot 41 is positioned just in front of slot 42 and slot 43 is positioned just in front of slot 44.

The left side track assembly 16 includes a left side track 50 which is mounted for movement around a left side track beam 51 (also known as a track support). The track beam is manufactured by bending an appropriately shaped piece of sheet metal into a generally upside down U-shape so as to form an inner panel 53, a top panel 54 and an outer panel 55. A bottom panel (the equivalent of bottom panel 156, see FIG. 6) is welded to the bottom of the inner and outer panels to form a box like beam. The track beam includes a track slider 57 (see FIG. 5) mounted on top of the top panel. A drive sprocket 58 is mounted at the rear of the track beam and is driven by a left side drive motor 59. At the front of the track beam 51 is an idler sprocket 60 and mounted at the bottom of the track beam 51 are three rollers (not shown) which are attached to the track beam by at least respective bolts 61, 62 and 63. The motor 59, drive sprocket 58, idler sprocket 60, track slider 57 and rollers act, in a known manner to drive the left side track 50.

The right side track assembly has a similar track beam with components that fulfil the same function as on the left side track assembly being labelled 100 greater.

The left side track beam 51 is attached to laterally extending beams 71 and 73. Beam 71 is generally rectangular in cross-section and is attached to left side track beam 51 at apertures 76 and 77 by suitable attachment method, in this case by welding. Beam 73 is similarly attached to the left side track beam 51.

The right side track beam 151 is attached to two laterally extending beams 72 and 74 in a like manner to beam s 71 and 73 being attached to left side track beam 51.

As will be appreciated beams 71 and 73 extend inwardly relative to the left side track beam 51 and beams 72 and 74 extend inwardly relative to the right side track beam 151.

The left side track beam 51 includes apertures 64, 65 and 66 and right side track beam 151 includes corresponding apertures 164, 165 and 166. Aperture 164 is aligned with beam 71, aperture 64 is aligned with beam 72, aperture 165 is aligned with beam 73 and aperture 65 is aligned with beam 74. Each of apertures 64, 65, 164 and 165 are generally rectangular.

The purpose of apertures 64, 65, 164 and 165 is to allow the appropriate end of beams 71, 72, 73 and 74 to pass into the appropriate track beam 51, 151 thereby allowing the distance between the right and left side track assemblies to be relatively small when in the retracted position but nevertheless maintain a suitable overlap of each beam 71, 72, 73 and 74 with the chassis when the right and left side track assemblies are in their extended position.

Figure 3:
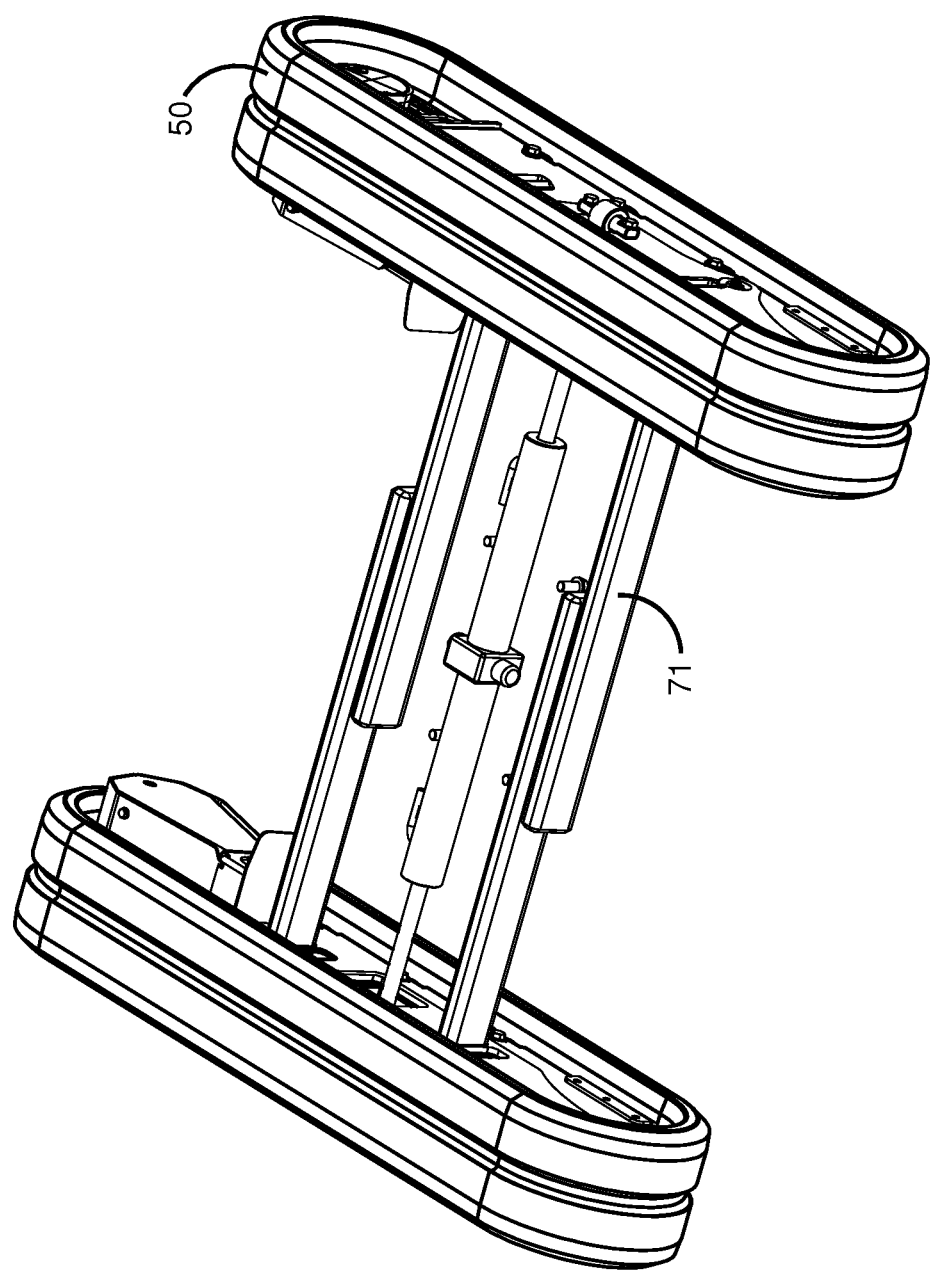
Figure 4:
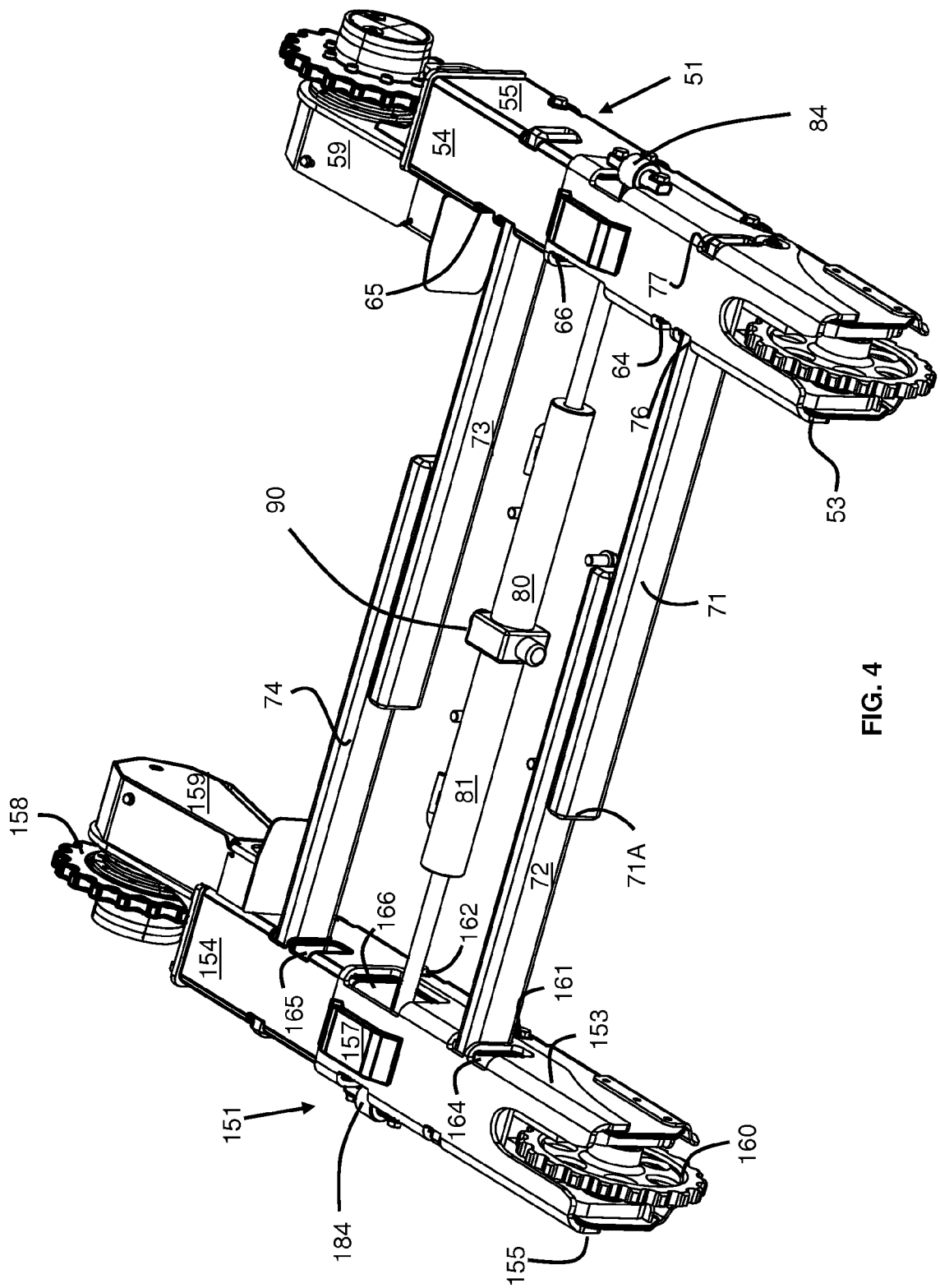
Figure 5:
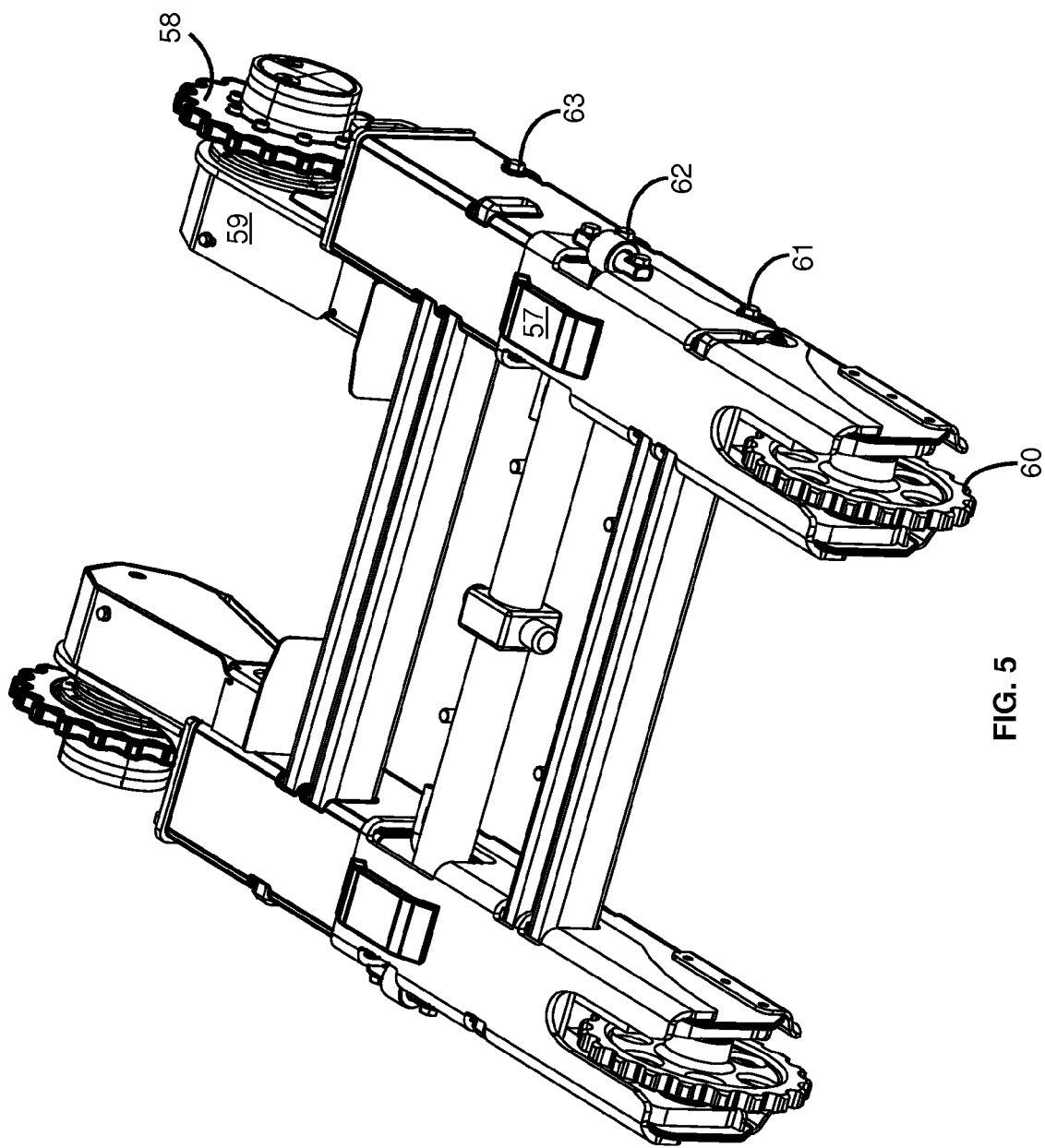
FIG. 5 shows an isometric view (looking from the front left side) of part of the working machine of FIG. 1 with the tracks in their retracted position.
Figure 6:
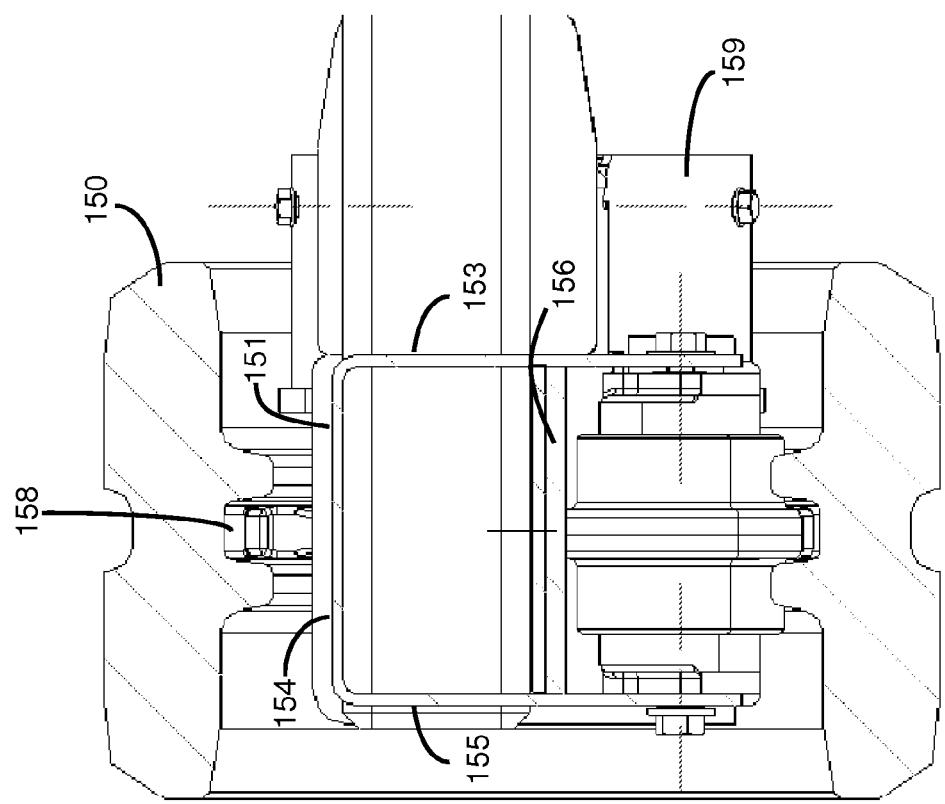
FIGS. 6, 7 and 11 show cross-sections (looking from the front) of track beams of the working machine of FIG. 1, and FIGS. 8 and 9 show a cross-section (looking from the front) of the actuator of the working machine of FIG. 1.
Figure 7:
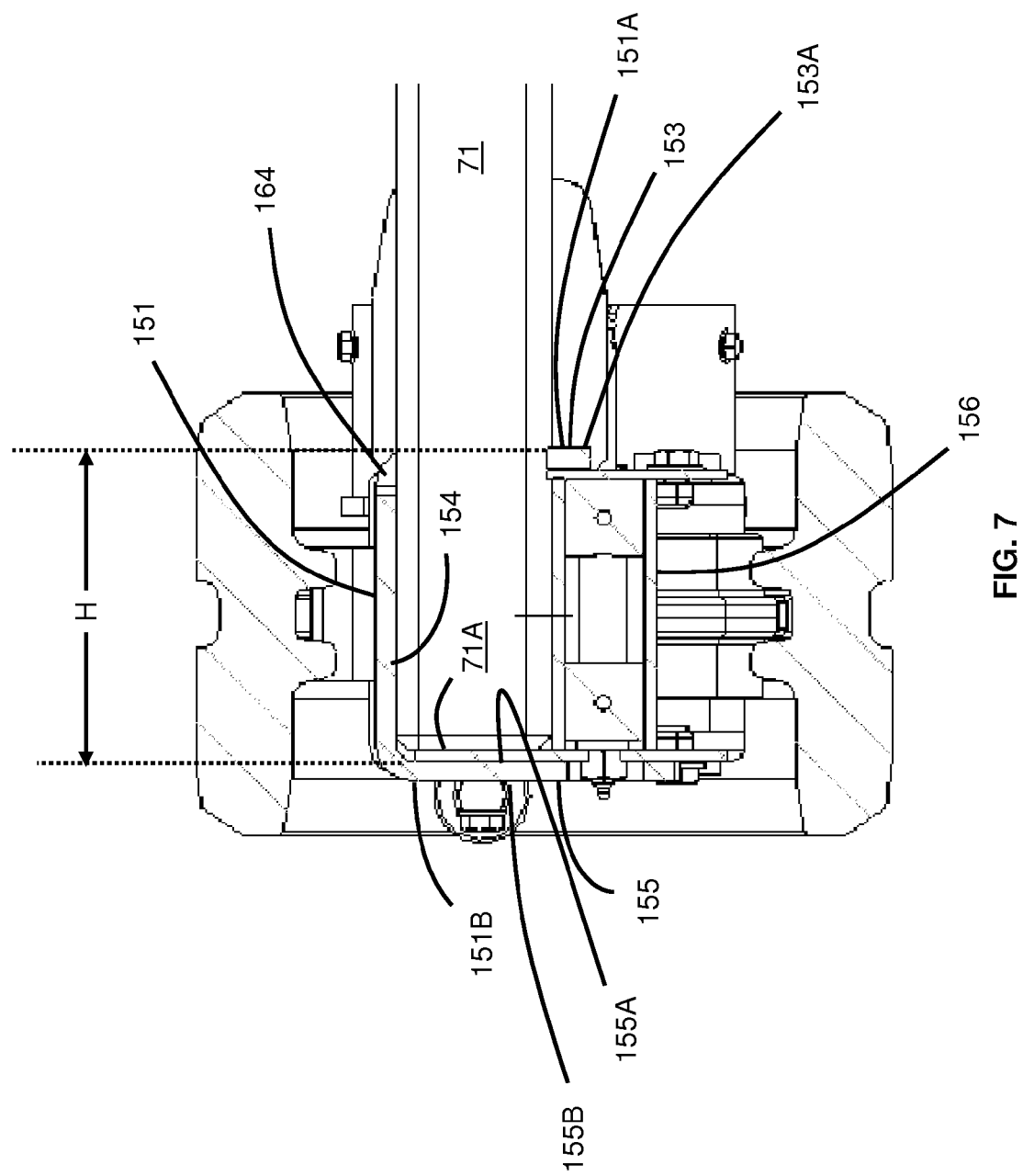

In more detail, as can be seen in FIG. 2, beam 71 is slideably mounted in laterally orientated rectangular slot 41 of chassis 12, beam 72 is slideably mounted in slot 42, beam 73 is slideably mounted in slot 43 and beam 74 is slideably mounted in slot 44. Consideration of FIGS. 2 and 3 show that beam 71 overlaps the chassis 12 by distance G when the track assemblies are in their extended position. However, consideration of FIGS. 5 and 7 shows that end 71A of beam 71 passes through aperture 164 and abuts an inner face 155A of outer panel 155. Accordingly, it is possible to vary the distance between the right and left side track assemblies by a greater extent than has been possible with the prior art. Either the distance between the right and left side track side assemblies can be made smaller in the retracted position, by the distance H that the beam 71 is inserted into the track beam assembly 51, or, by providing a longer beam 71 the maximum distance between the right and left side track assemblies can be made greater by the distance H that beam 71 extends into the track beam 151 whilst maintaining the same overlap G when the right and left side track assemblies are in their extended position.

As will be appreciated, in this embodiment, beams 72, 73 and 74 also overlap by a distance equivalent to overlap G relative to the chassis when the right and left side track assemblies are in their deployed position and beams 72, 73 and 74 similarly extend into their appropriate right or left side track beam by a distance (H) when the right and left side track assemblies are in there retracted position.

Figure 8:
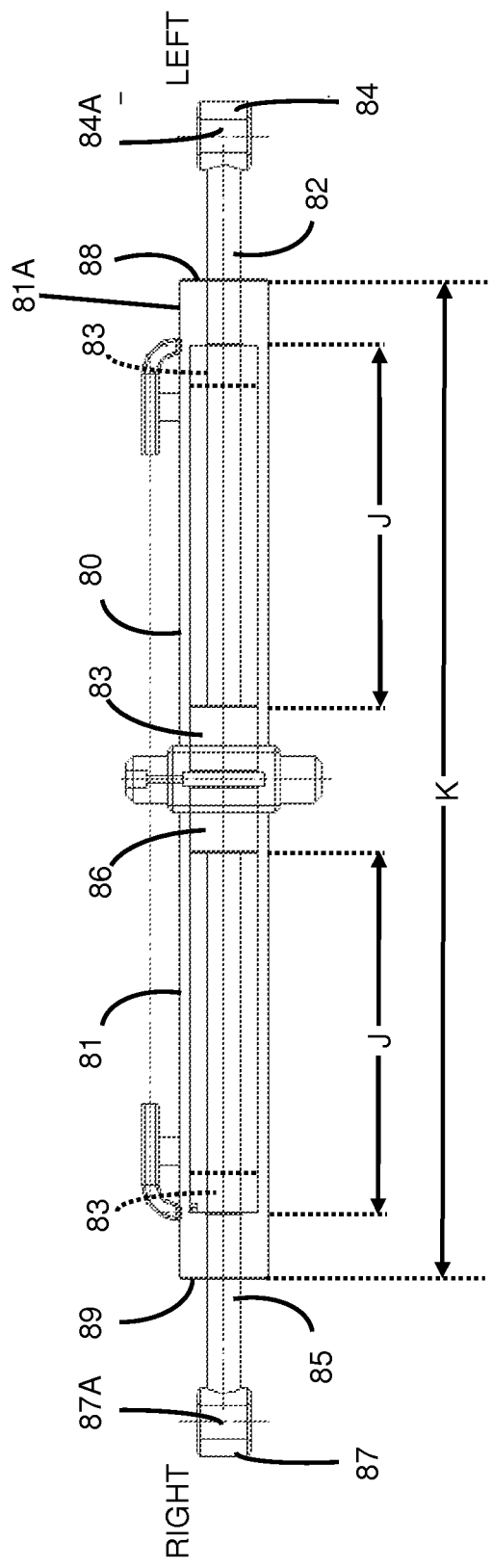
Figure 9:
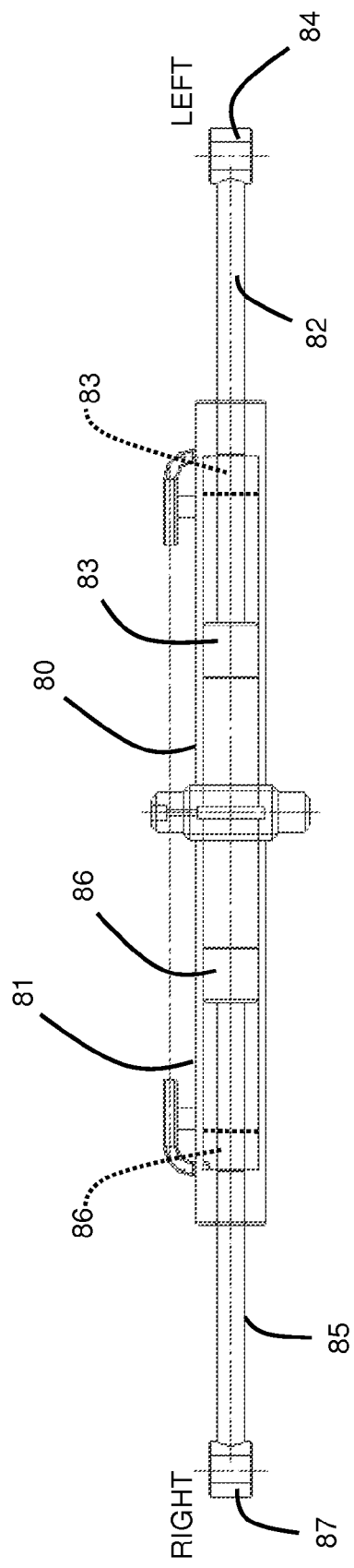

In order to move the track assemblies between their retracted and extended position, the machine 10 includes a hydraulic actuator 80. In this case the hydraulic actuator 80 is a double acting ram. Thus, the actuator includes a cylinder 81, a left side rod 82 attached at one end to a left side piston 83, and attached at another end to a left side rod end 84. A right side rod 85 is similarly attached to a right side piston 86 and a right side rod end 87. The left side rod passes through a left side end face 88 of cylinder 81 and the right side rod 85 passes through a right side end face 89 of cylinder 81. Consideration of FIGS. 8 and 9 shows that in the retracted position (FIG. 8) pistons 83 and 86 are close together, and in the extended position (see dotted lines showing piston 83 and 86 in extended position) piston 83 is close to left side end face 88 of cylinder 81 and piston 86 is close to right side end face 89 of cylinder 81. Thus, the maximum extent by which each rod 82 and 85 can extend is distance J which in turn is limited by the overall length K of the cylinder 81.

Figure 10:
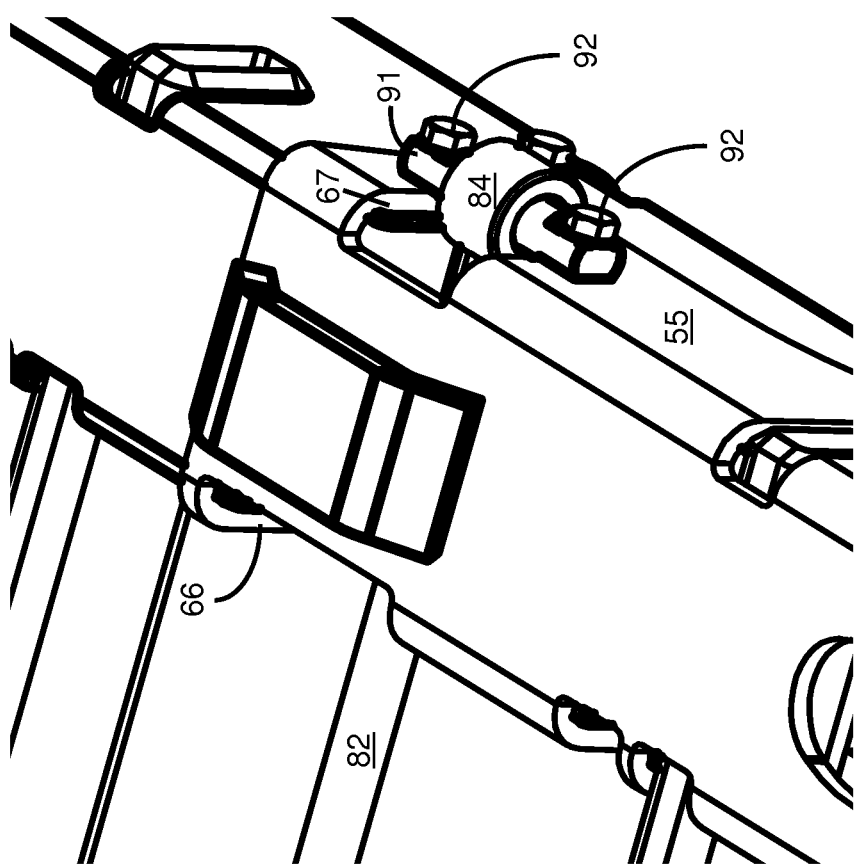
Figure 11:
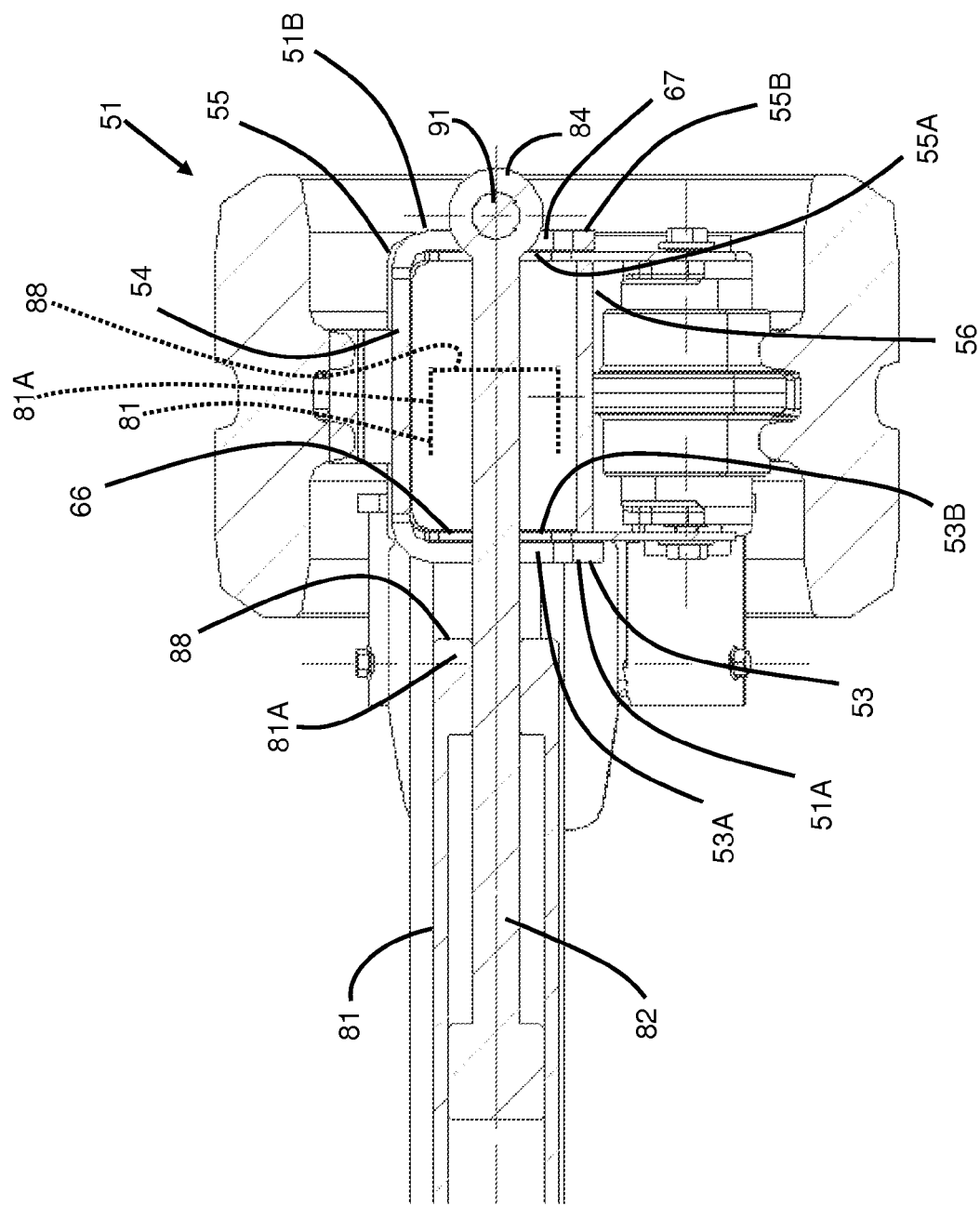

The cylinder 80 is mounted via mounting 90 to the chassis 12. A mounting pin 91 (see FIG. 10) passes through aperture 84A of left side rod end 84. As can be seen, mounting pin 91 is fixed, via bolts 92 to the outside of outer panel 55. In order to do this, the rod 82 passes through aperture 66 and aperture 67 in outer panel 55. As can be seen in FIG. 10, aperture 67 is sized to receive rod end 84 whereas aperture 66 is significantly larger. In particular, aperture 66 is sized to receive part of cylinder 81. Thus, consideration of FIG. 11 shows that, in the retracted position (see dotted line showing position of end of cylinder 81), end 81A of cylinder 81 is received in aperture 66. By positioning end 81A of cylinder 81 inside the cross-section of the left side track beam 51 when in the retracted position allows for a longer overall length of the cylinder 81. Having a longer cylinder 81 allows for a greater extension of each rod, which in turn allows the right and left side track assemblies to be positioned further apart when in the extended position without having to increase the spacing between the right and left side track assembly when in the retracted position.

As described, the working machine 10 has a right and left side track assembly, both of which are extendible and retractable relative to the chassis. The invention is equally applicable to a machine having only one track assembly extendible and retractable relative to the chassis.

As described, working machine 10 is a mini excavator though the invention is applicable to other working machines.

As described, the working machine 10 has a working arm 20 in the form of a boom, tipper arm and bucket. In further embodiments alternative implements may be used on the working machine.

As described, the laterally orientated rectangular slot 41, 42, 43 and 44 all have a generally rectangular cross-section in order to receive the respected beams 71, 72, 73 and 74, which have a similar rectangular cross-section. In further embodiments any appropriate shape of slot could be used to receive any appropriate shape of beam.

As described above, the right side track assembly has two beams in total (beams 72 and 74) and the left side track assembly has two beams in total (beams 71 and 73). In further embodiments one or both track assemblies may have more than two beams or less than two beams.

As described above, the track beams are formed by bending sheet metal into an upside down U-shape and then welding a bottom panel across the open end of the U-shape. In further embodiments, any type of suitable construction could be used to form the track beam including fabricating the beam from several flat panels or manufacturing the beam by casting the beam.

As described above, each track beam assembly has a track slider, though in further embodiments more than one track slider could be used, or alternatively one or more rollers could be used in place of the track slider.

As described above, the drive sprockets are positioned at the rear of the machine, though in further embodiments they could be positioned at the front of the machine.

The drive motors 59 and 159 are hydraulic drive motors supplied with pressurised hydraulic fluid from a pump associated with the prime mover. In further embodiments the drive motors could be any type of suitable drive motor including an electric drive motor.

As described above, each track beam has three lower rollers, and in further embodiments more or less than three lower rollers can be provided.

As described above, the apertures 64, 65, 66, 67, 164, 165, 166 and 167 are of a shape to accommodate the appropriate beam 71, 72, 73, 74 or cylinder 81. In further embodiments any shape of apertures could be provided so as to accommodate the appropriate shape of the associated beam/cylinder.

As described above, when in the retracted position the end of the beams 71, 72, 73 and 74 abut the inner face of the outer panel of the associated track beam. This acts as a stop to limit how close the right side track assembly is positioned relative to the left side track assembly when in the retracted position. In further embodiments suitable stops could be provided elsewhere on the machine.

As can be seen from FIG. 7, end 71A of beam 71 is positioned outboard of the inner face 151A of the track beam 151. In this case the inner face 151A of the track beam 151 is defined by the inner face 153A of the inner panel 153, though in further embodiments the inner face of the track beam may be defined by other components, depending upon the nature of the construction of the beam, especially where the beam is a cast beam.

Figure 12:
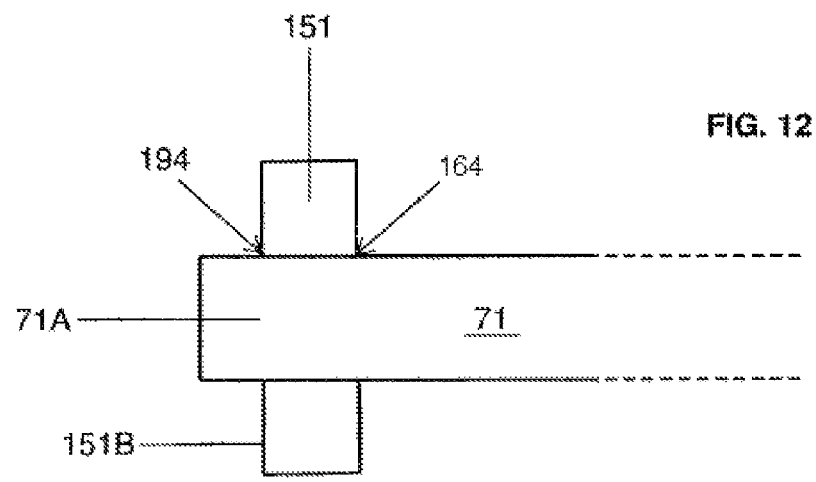
FIG. 12 is a schematic view of an embodiment of the track beam 71.
Figure 13:
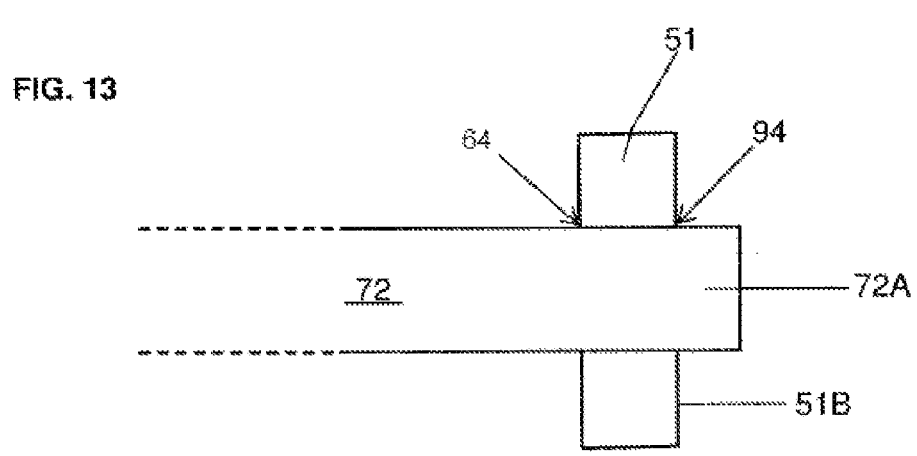
FIG. 13 is a schematic view of an embodiment of the track beam 72.

As shown in FIG. 7, the track beam 151 defines an outer face 151B, which in this case is defined by an outer face 155B of outer panel 155. In further embodiments, as illustrated in FIGS. 12 and 13, a portion (e.g., the end 71A or the end 72A) of the laterally extending beam 71 or 72 may be positioned outboard of the outer face 151B or 51B of the track beam 151 or 51 when the working machine is in the retracted position. Such an outer face 151B or 51B may include an aperture 194 or 94 through which the portion (e.g., the end 71A or the end 72A) passes.

As shown in FIG. 7, the beam 151 is constructed by arranging an inner panel 153 to be connected to an outer panel 155 by connecting portions, in this case top panel 154 and bottom panel 156. In further embodiments an inner panel may be connected to an outer panel by any form of connecting portion including a single connecting portion.

As shown in FIG. 11 portions of the hydraulic actuator (for example, part of rod 82 and rod end 84) are positioned outboard of the inner face 51A of the track beam 51. Furthermore, certain portions of the hydraulic actuator (in this case part of rod end 84) are positioned outboard of the outer face 51B of the track beam 51.

As can be seen in FIG. 11 the pin 91 could be positioned elsewhere relative to the track beam, for example at least a portion of the pin 91 could be positioned outboard of the inner face 51A of the track beam (as is the case in FIG. 11). Alternatively, all of the pin 91 could be positioned outboard of the inner face 51A of the track beam (as is the case in FIG. 11). Alternatively, at least a portion of the pin could be positioned outboard of the outer face 51B (as is the case in FIG. 11). Alternatively all of the pin 91 could be positioned outboard of the outer face 51B (not shown in FIG. 11). Positioning of the pin clearly defines the position of the associated aperture 84A and rod end 84.

As shown above, actuator 80 is a double piston ram. As such, the left side rod, left side piston, left side rod end and left side part of cylinder 81 act as an actuator for moving the left track assembly and the right side rod, right side piston, right side rod end and right side part of the cylinder 81 can be considered to be an actuator for moving the right side track assembly. Accordingly, the system can be considered to have two actuators with a common cylinder 81. In further embodiments two separate actuators could be provided, one for each track assembly, in particular a single piston ram could be used to move one track assembly and a further single piston ram could be used to move the other track assembly. Under these circumstances each single piston ram could be operated independently if it was necessary to move one track assembly independently from the other. In other embodiments a single piston and ram may connect to the track supports and extend both. The or each actuator may not be directly secured to the chassis, and instead stops may be provided elsewhere e.g. on the beams.

The actuator for moving the track support may be an electromechanical actuator, such as a linear actuator.

As shown in FIG. 11, the end face 88 of cylinder 81 is positioned outboard of the inner face 51A of the track beam 51. It is also positioned outboard of the inner face 53A of the inner panel 53 and it is also positioned outboard of the outer face 53B of the inner panel 53. In further embodiments, an end face of a cylinder may similarly be positioned outboard of an inner face of a track beam of differing construction, it may be positioned outboard of an inner face of an inner panel of a track beam of a differing construction, and it may be positioned outboard of an outer face of an inner panel of a track beam of a differing construction.

As described above, the ends of beams 71, 72, 73 and 74 being positioned within the box structure of the appropriate track beam when in the retracted position give certain advantages. These advantages can be achieved independently of where the rod ends of the actuator are mounted. Similarly the particular positioning of the rod end of the actuator as described above gives certain advantages and this is similarly independent of where the ends of the laterally extending beams are positioned when the machine is in its retracted position. However, by combining the positioning the ends of the laterally extending beams in the opposite track beam assembly together with positioning part of the actuator (for example the rod end) outboard of the inner face of the associated track beam provides for a particularly synergistic relationship of concepts. Thus, for example, the extra track width achievable by positioning the lateral extending beam ends outboard of the associated track beam inner surface will require a hydraulic actuator having a longer stroke, and in order to accommodate this longer stroke, the ends of the actuator can be positioned outboard of the inner face of the associated track beams when in the retracted position.

The invention claimed is:

1. A working machine including:
    a chassis,
    a first track assembly including a first track mounted for movement around a first track support, the first track support defining a first inner face, the first track assembly being mounted moveably relative to the chassis to vary the distance between the chassis and the first track assembly, an actuator having a first end mounted on the first track support and having a portion grounded on a separate portion of the working machine such that the actuator is operable to vary the distance between the chassis and the first track assembly in which at least a portion of the first end is positioned outboard of the first inner face, and wherein the first track support defines a first outer face, and further wherein said at least a portion of the first end is positioned outboard of the first outer face.

2. A working machine as defined in claim 1 wherein the first inner face includes an aperture through which said at least a portion of the first end passes.

3. A working machine as defined in claim 1 wherein the first outer face includes an aperture through which said at least a portion of the first end passes.

4. A working machine as defined in claim 1 wherein the first end includes a first end aperture for receiving a first mounting pin wherein
at least a portion of the first end aperture is positioned outboard of the first inner face.

5. A working machine as defined in claim 1 wherein the actuator is a hydraulic actuator.

6. A working machine as defined in claim 5 wherein the hydraulic actuator includes a first piston moveably mounted in a first cylinder and the first end is connected to the first piston by a first rod, the first rod passes through a first end face of the first cylinder wherein the first end face is positioned outboard of the first inner face.

7. A working machine as defined in claim 1 wherein the first track support includes at least an inner panel defining a first inner surface and an outer panel and a connecting portion connecting the inner panel to the outer panel.

8. A working machine as defined in claim 1 including a second track assembly including a second track mounted for movement around a second track support, the second track support defining a second inner face, the second track assembly being mounted moveably relative to the chassis to vary distance between the chassis and the second track assembly
the actuator having a second end mounted on the second track support such that the actuator is operable to vary the distance between the chassis and the second track assembly in which at least a portion of the second end is positioned outboard of the second inner face.

9. A working machine as defined in claim 8 wherein the second inner face includes an aperture through which said at least a portion of the second end passes.

10. A working machine comprising:
a chassis;
a first track assembly including a first track mounted for movement around a first track support, the first track assembly being mounted to the chassis by at least a first beam, the first beam being moveable relative to the chassis to vary the distance between the chassis and the first track assembly, the first track support defining a first inner face;
a second track assembly including a second track mounted for movement around a second track support, the second track support defining a second inner face;
the working machine having an extended position and a retracted position such that the first track assembly is spaced further from the second track assembly when in the extended position than when in the retracted position;
wherein when the working machine is in the retracted position a first portion of the at least first beam is positioned outboard of the second inner face;
an actuator having a first end mounted on the first track support and having a portion grounded on a separate portion of the working machine such that the actuator is operable to vary the distance between the chassis and the first track assembly in which at least a portion of the first end is positioned outboard of the first inner face;
wherein the second track support defines a second outer face and wherein when the working machine is in the retracted position said first portion of the first beam is positioned outboard of the second outer face;
wherein the first track support defines a first inner face, and the second track assembly is mounted to the chassis by at least a second beam, the second beam being moveable relative to the chassis to vary the distance between the chassis and the second track assembly, wherein when the working machine is in the retracted position a second portion of the second beam is positioned outboard of the first inner face;
wherein the first track support defines a first outer face and wherein when the working machine is in the retracted position said second portion of the second beam is positioned outboard of the first outer face; and
wherein said at least a portion of the first end is positioned outboard of the first outer face.

11. A working machine as defined in claim 10 wherein the second inner face includes an aperture through which said portion passes.

12. A working machine as defined in claim 10 wherein the second outer face includes an aperture through which said first portion passes.

13. A working machine as defined in claim 10 wherein the second track support includes at least an inner panel defining the second inner surface and an outer panel and a connecting portion connecting the inner panel to the outer panel.

14. A working machine as defined in claim 10 wherein the first inner face includes an aperture through which said second portion passes.

15. A working machine as defined in claim 10 wherein the first outer face includes an aperture through which said second portion passes.

16. A working machine as defined in claim 10 wherein the first track support includes at least an inner panel defining the first inner surface and an outer panel and a connecting portion connecting the inner panel to the outer panel.

* * * * *